Nov. 15, 1932.        A. OLSON        1,888,200
TRAP SETTER'S TOOL
Filed July 21, 1930    2 Sheets-Sheet 1
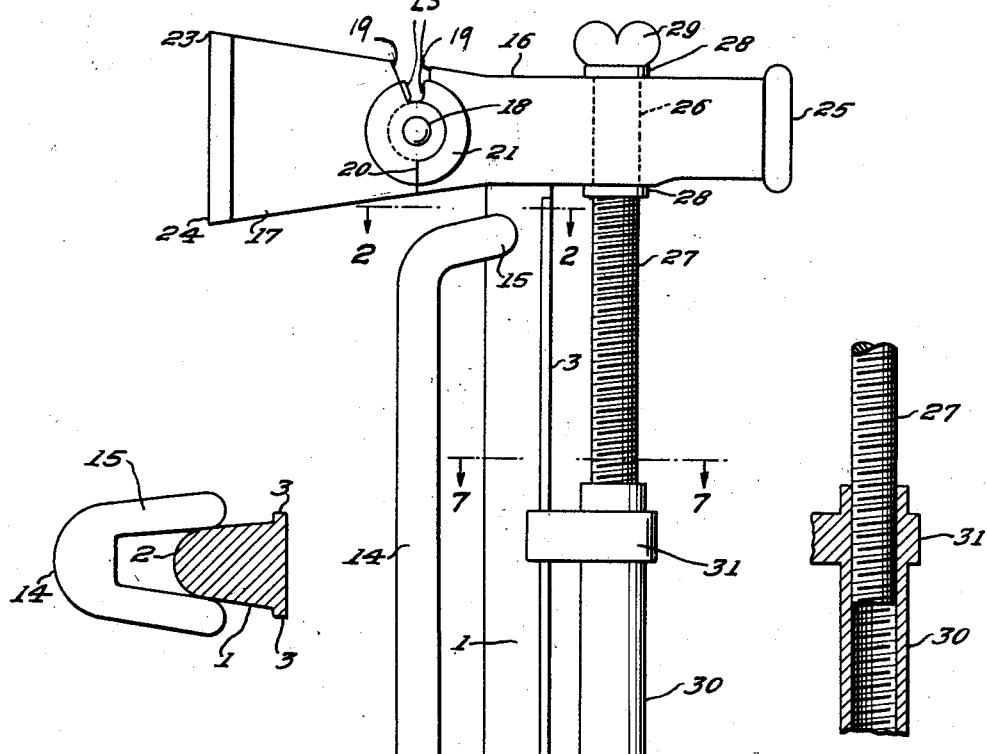
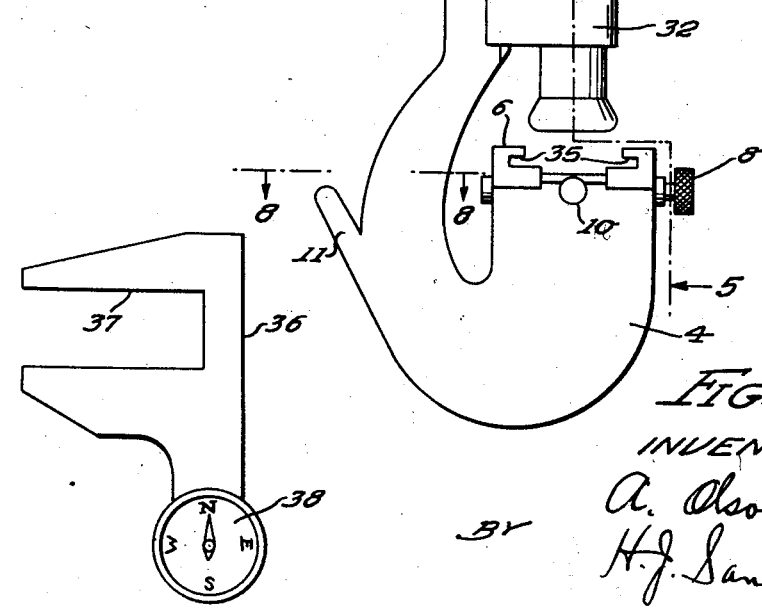

Nov. 15, 1932.  A. OLSON  1,888,200
TRAP SETTER'S TOOL
Filed July 21, 1930  2 Sheets-Sheet 2

INVENTOR:
A. Olson
BY H.J. Sanders
ATTORNEY

Patented Nov. 15, 1932

1,888,200

UNITED STATES PATENT OFFICE

ANTON OLSON, OF EVANSTON, ILLINOIS, ASSIGNOR OF ONE-HALF TO MARTHA M. HENRICHS, OF EVANSTON, ILLINOIS

TRAP SETTER'S TOOL

Application filed July 21, 1930. Serial No. 469,360.

This invention relates to improvements in trap setters' tools. One object is to provide a tool of this type that will set any size animal trap. A further object is to provide such a tool that combines in one, a setter, placer, locator, spur driver, wire cutter, hammer, hatchet, etc. etc. A still further object is to provide a trap setter's tool that is of simple construction, durable in use, efficient in operation, and cheap to manufacture.

With the foregoing and other objects in view the invention consists in the combination and arrangement of parts to be hereinafter fully described, pointed out in the claims and illustrated in the accompanying drawings which form a part of this application for patent and in which—

Fig. 1 is a view of the trap setter's tool in side elevation.

Fig. 2 is a cross sectional view taken on the line 2—2 of Fig. 1.

Fig. 3 is a fragmentary sectional view through the plunger and actuating shaft therefor.

Fig. 4 is a face view of a separate clamp and compass sometimes employed.

Like reference characters denote corresponding parts throughout the several views.

Figure 5:
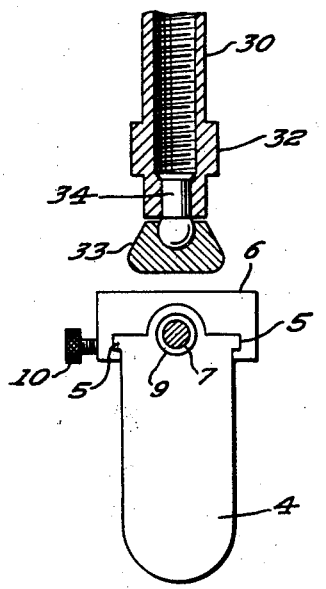
Fig. 5 is a view partly in section and partly in elevation and is taken on the line 5—5 of Fig. 1.
Figure 6:
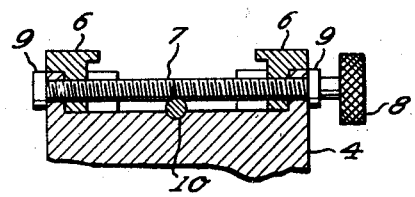
Fig. 6 is a fragmentary sectional view, enlarged, through Fig. 5.
Figure 7:
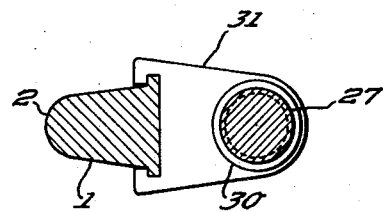
Fig. 7 is a cross sectional view, enlarged, through Fig. 1 on the line 7—7 thereof.
Figure 9:
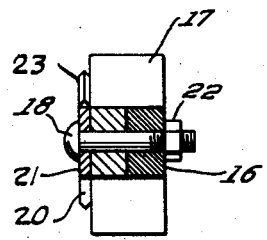
Fig. 9 is a fragmentary sectional view through the wire cutter.
Figure 8:
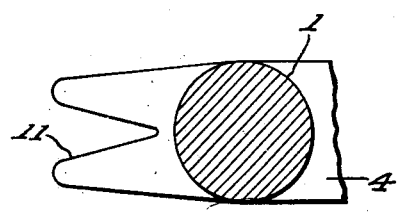
Fig. 8 is a similar view on the line 8—8 of Fig. 1.

The tool comprises a frame having a shank 1 one edge 2 of which is rounded and the opposite edge formed with the flanges 3, said shank terminating at one end in the enlarged hook-shaped portion 4 formed terminally with the flanges 5 that serve as guides for the travelling jaws 6, 6 mounted upon the screw shaft 7 operatively supported by said hook 4, said shank being provided at one end with the knurled head 8 and contiguous to its threaded portion with the stop collars 9, 9, the threaded portion of said shaft comprising right and left hand threads at opposite ends to correspond to the like threaded portions of the jaws 6, 6. As the head 8 is rotated in one direction the jaws 6, 6 are caused to move toward each other and when rotated in the opposite direction said jaws move away from each other. A set screw 10 carried by the end 4 of the shank extends transversely thereof for frictional engagement with the screw shaft 7, said pin being formed with a recessed portion that may by partial rotation of the set screw be disposed contiguous to the screw shaft when rotation of the same without hindrance is desired. The set screw is provided to act, in one position, as a brake for the screw shaft to frictionally retain it in set position but when the recessed portion of the set screw is disposed contiguous to the screw shaft the latter may be rotated without frictional hindrance.

The hook-shaped portion of the shank is formed further with the integral claw 11 to be used as a nail puller and with the ears or lugs 12 connected by the pin 13 that pivotally carries the fork 14 having the pronged end 15 that normally engages the rounded edge 2 of the shank 1 but by manually moving the fork upon its pin until it extends outwardly from the shank it may be used as a trap placer or locator, to pick up the trap, to place traps in or remove them from the water, etc. The pin 13, while a pivot pin, may be close or tight fitting so that the pivotal movement of the fork is resisted and it may frictionally hold any adjusted position.

The shank 1 is integral with the sectional hatchet-like head comprising the sections 16, 17 pivotally connected together by the bolt 18, said sections being notched to form cutting edges 19 at their top edges and being normally separated by a notch or cut-out 20 along the lower edges. The bolt 18 fits very tightly in the perforations in the head sections 16, 17 through which it passes so that the said sections, while capable of pivotal movement, are frictionally held rigid. A cutter disc 21 formed with a blade-forming notch 23 is frictionally anchored upon the bolt 18 with its notch normally registering with the notch formed by the cutting edges 19 of the head, said bolt 18 being provided with a nut 22 upon its threaded end to permit tightening of the cutter disc against the head. The blades 19 and 23 form a wire cutter. When a wire is placed in the aligned notches between said blades, to be cut, the uppermost corner 23' of the head section 17 is struck sharply against an object, such as a tree, log, or the ground, thus forcing this head section to move pivotally upon the bolt 18 thus closing the cutting edges or blades 19 upon the wire cutting the same. To reset the head section 17 its lower point or corner 24 is struck against a tree or other object thus again moving the section pivotally and separating the cutting edges 19.

The head 16, 17 is formed with the hammer end 25 for driving nails, the section 16 being perforated to receive the non-threaded portion 26 of the rotary threaded shaft 27, stop collars 28 being provided at the ends of the shaft portion 26 and abutting the head section 16, a butterfly 29 terminating the upper end of said shaft. An interiorly threaded sleeve or plunger 30 telescopically receives the shaft 27, integral followers 31, 32 formed upon said sleeve slidably engaging the flange 3 of the shank 1. Rotation of the butterfly manually will rotate shaft 27 and cause the sleeve 30 to travel up or down thereover. A head 33 is secured by the swivel pin 34 to the lower end of the sleeve 30.

To set a trap with the trap setter the jaws 6, 6 are separated, by operation of the screw shaft 7, to snugly receive the trap spring. With the lower arm of the trap spring disposed in the recesses 35 of the jaws, the plunger sleeve having previously been raised to provide clearance therefor, the sleeve 30 is lowered until the head 33 engages the upper arm of the trap spring. Further lowering of the arm 30 will depress the spring arm thus releasing the trap jaws which may gravitate, or be manually moved without danger, into horizontal or set position and be there locked by the trigger in the usual way. The sleeve 30 may now be raised out of contact with the trap spring and trap manually removed and placed, the jaws 6, 6 having been separated to permit the trap release.

If the trap is of the double spring type an one-piece clamp 36 comprising the jaw 37 may be applied to a trap spring before the setting tool is disengaged therefrom. This clamp is applied to the trap spring right beside the tool. The setting tool is now removed and applied, in the same manner described, to the second trap spring. Both the clamp and setting tool proper are removed when both trap springs are depressed and the trap set. A compass 38 carried by the clamp 36 may be handily provided so that the trapper need not lose his direction at any time.

What is claimed is:—

1. In a trap setter's tool, a shank having a hook-shaped end, manually adjustable jaws carried thereby, a head at one end of said shank, and a plunger carried by said head and disposed above said jaws.

2. In a trap setter's tool, a shank having a hook-shaped end, manually adjustable jaws carried thereby, a head at one end of said shank, and a plunger carried by said head and disposed above said jaws and slidably engaging said shank.

3. In a trap setter's tool, a shank, manually operable jaws carried thereby, a head at one end of said shank, and a plunger carried by said head and disposed above said jaws.

4. In a trap setter's tool, a shank having a hook-shaped end, manually adjustable jaws arranged upon the upturned end thereof, a head at one end of said shank, a screw shaft carried by and depending from said head, a tubular threaded plunger telescopically receiving said screw shaft and actuated thereby, said plunger being disposed above said jaws, and followers for said plunger slidably engaging said shank.

5. In a trap setter's tool, a shank having a hook-shaped end, a screw shaft carried by said end, a locking screw for said screw shaft, travelling jaws operatively mounted to said screw shaft, a head at one end of said shank, and a plunger carried by said head and disposed above said jaws.

In testimony that I claim the foregoing as my own I have hereto affixed my signature.

ANTON OLSON.